United States Patent
Inui et al.

(10) Patent No.: US 7,530,146 B2
(45) Date of Patent: May 12, 2009

(54) ASSIST GRIP

(75) Inventors: Shuji Inui, Aichi-ken (JP); Minoru Toda, Aichi-ken (JP); Takuji Nagata, Aichi-ken (JP); Akiyoshi Nagano, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 0 days.

(21) Appl. No.: 11/898,516

(22) Filed: Sep. 13, 2007

(65) Prior Publication Data
US 2008/0067824 A1 Mar. 20, 2008

(30) Foreign Application Priority Data
Sep. 14, 2006 (JP) .............................. 2006-249439

(51) Int. Cl.
*B25G 1/10* (2006.01)
(52) U.S. Cl. .............................. 16/438; 16/436; 16/445; 296/1.02; 280/727
(58) Field of Classification Search .................. 16/438, 16/436, 444–445, 114.01, 408, 431, 110.1; 403/326–327; 74/543; 296/1.02; 280/727; 190/115
See application file for complete search history.

(56) References Cited
U.S. PATENT DOCUMENTS

| | | | | |
|---|---|---|---|---|
| 1,004,683 A | * | 10/1911 | Pritchard et al. | 220/755 |
| 1,506,694 A | * | 8/1924 | Toffey | 16/445 |
| 2,672,103 A | * | 3/1954 | Hohmes | 105/354 |
| 4,658,467 A | * | 4/1987 | Stolarz | 16/114.1 |
| 5,898,973 A | * | 5/1999 | Schmidt | 16/445 |
| 6,003,202 A | * | 12/1999 | Dauterive | 16/429 |
| 6,467,130 B2 | * | 10/2002 | Kurachi et al. | 16/438 |
| 6,536,301 B1 | * | 3/2003 | Luksch et al. | 74/543 |
| 6,616,222 B1 | * | 9/2003 | Ponceau | 296/214 |
| 2005/0028323 A1 | * | 2/2005 | Meyer et al. | 16/445 |
| 2008/0067788 A1 | * | 3/2008 | Inui et al. | 280/727 |

FOREIGN PATENT DOCUMENTS

JP A-06-190866 7/1994

* cited by examiner

*Primary Examiner*—William L. Miller
(74) *Attorney, Agent, or Firm*—Posz Law Group, PLC

(57) ABSTRACT

A latitudinal division type assist grip having a sufficient load bearing capacity is provided. The assist grip includes an outer cylinder member, a first divisional body, a second divisional body, and an elastic reinforcement member. A first fitting end portion of the first divisional body and a second fitting end portion of the second divisional body are fitted to each other inside the outer cylinder member. The elastic reinforcement member is interposed between an inner peripheral surface of the outer cylinder member and the first fitting end portion, and presses the first fitting end portion toward the second fitting end portion.

3 Claims, 6 Drawing Sheets

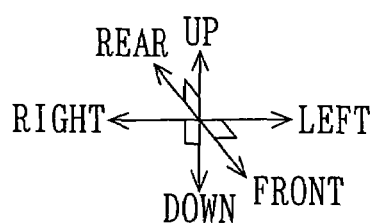
FIG.7
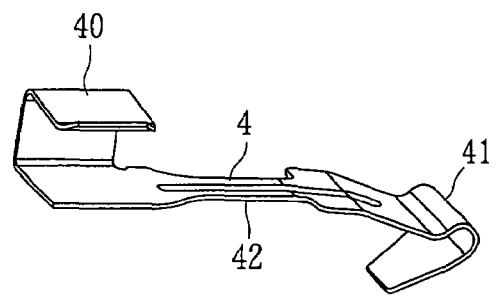
FIG.8
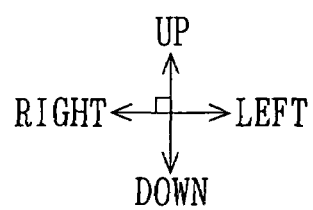
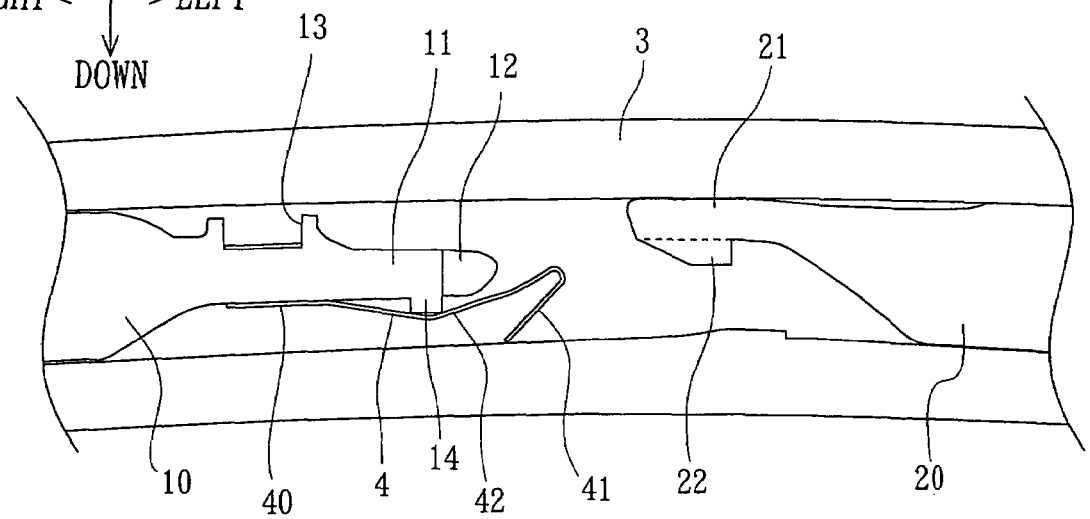

ASSIST GRIP

INCORPORATION BY REFERENCE

The disclosure of Japanese Patent Application No. 2006-249439 filed on Sep. 14, 2006, including the specification, drawings, and abstract is incorporated by reference in its entirety.

BACKGROUND OF THE INVENTION

1. Field of the Invention

The present invention relates to an assist grip which is provided in a vehicle and the like.

2. Description of the Related Art

An assist grip is a member which is mounted in a vehicle and the like to be used as a handrail for passengers (for example, refer to Japanese Laid-Open Patent Publication No. 6-190866). There is a kind of assist grip that includes two or more divisional bodies which are separately formed and unitarily assembled.

There are two types of divisional bodies of the assist grip, one of which is formed by partitioning the assist grip in a longitudinal direction, and the other of which is formed by partitioning the assist grip in a direction across the longitudinal direction. Hereinafter, the divisional body formed by partitioning the assist grip in the longitudinal direction will be referred to as a longitudinal divisional body, and the assist grip having the longitudinal divisional bodies will be referred to as a longitudinal division type assist grip. Also, the divisional body formed by partitioning the assist grip in the direction across the longitudinal direction will be referred to as a latitudinal divisional body, and the assist grip having the latitudinal divisional bodies will be referred to as a latitudinal division type assist grip.

In the latitudinal division type assist grip, a junction portion between the divisional bodies is formed in the direction across the longitudinal direction of the assist grip. Accordingly, when compared to the longitudinal division type assist grip, the latitudinal division type assist grip is weak in a load applied in the direction across the longitudinal direction of the assist grip. When the assist grip is used as a handrail for passengers, a load is applied to the assist grip in the direction across the longitudinal direction of the assist grip. Accordingly, the load bearing capacity required at the junction portion between the divisional bodies in the latitudinal division type assist grip is larger than the longitudinal division type assist grip.

In the latitudinal division type assist grip, if an outer periphery of the junction portion between the latitudinal divisional bodies is received in an outer cylinder member, which is made of a material having high stiffness and has a cylindrical shape, the load bearing capacity at the junction portion can be increased. In the latitudinal division type assist grip, the latitudinal divisional bodies can be joined to each other by adhesion, screw coupling, fitting, or the like. Considering the load bearing capacity and the simplicity of manufacturing, it is preferable to join the latitudinal divisional bodies to each other by fitting. In this case, in order to cover the fitting portion between the latitudinal divisional bodies with the outer cylinder member, as shown in FIG. 10, latitudinal divisional bodies 100 and 200 are respectively inserted into an outer cylinder member 300 through both ends of the outer cylinder member 300, and the latitudinal divisional body 100 and the latitudinal divisional body 200 are fitted to each other inside the outer cylinder member 300.

In order to securely fit the latitudinal divisional body 100 and the latitudinal divisional body 200 to each other, it is preferable to enlarge the fitting portion between the latitudinal divisional bodies (X portion in FIG. 11). In order to sufficiently secure the load bearing capacity of the assist grip, it is needed to increase the diameters of the thinnest portions of the respective latitudinal divisional bodies 100 and 200 (base portions 101 and 102, Y and Z portions in FIG. 11). However, as described above, because the assist grip is used as a handrail for passengers, an outer diameter and an inner diameter of the outer cylinder member 300 cannot be increased so largely. Accordingly, it is impossible to increase all of the fitting portion X of the latitudinal divisional body 100 and the latitudinal divisional body 200, the outer diameter Y of the base portion 101, and the outer diameter Z of the base portion 102. As a result, it is difficult to provide a latitudinal division type assist grip having a sufficient load bearing capacity.

SUMMARY OF THE INVENTION

Therefore, the present invention has been made in view of the above problems, and it is an aspect of the present invention to provide a latitudinal division type assist grip having a sufficient load bearing capacity.

An assist grip in accordance with the present invention comprises an outer cylinder member which is made of a material having high stiffness and has a cylindrical shape; a first divisional body which has a first fitting end portion and a first fixing end portion fixed to another side, the first fitting end portion being inserted into the outer cylinder member through one end side of the outer cylinder member; a second divisional body which has a second fitting end portion and a second fixing end portion fixed to another side, the second fitting end portion being inserted into the outer cylinder member through the other end side of the outer cylinder member and being fitted to the first fitting end portion; and an elastic reinforcement member which is made of an elastic material, wherein the elastic reinforcement member is interposed between an inner peripheral surface of the outer cylinder member and the first fitting end portion, and presses the first fitting end portion toward the second fitting end portion.

It is preferred that the assist grip in accordance with the present invention includes the following (1). It is more preferable to include (1) and (2).

(1) In the assist grip in accordance with the present invention, the elastic reinforcement member is configured as a plate spring, and has a reinforcement fixing portion formed at an end, a reinforcement latch portion formed at the other end, and a reinforcement elastic contact portion which is formed between the reinforcement fixing portion and the reinforcement latch portion. The reinforcement fixing portion is fixed to the first divisional body. When the first fitting end portion and the second fitting end portion are fitted to each other, at least the reinforcement latch portion and the reinforcement elastic contact portion are inserted into the outer cylinder member, the reinforcement latch portion is latched on the inner peripheral surface of the outer cylinder member, and the reinforcement elastic contact portion contacts elastically the first fitting end portion to press the first fitting end portion toward the second fitting end portion.

(2) In the assist grip in accordance with the present invention, when the first fitting end portion and the second fitting end portion are fitted to each other, the reinforcement latch portion is latched on the inner peripheral surface of the outer cylinder member and the second divisional body.

The assist grip in accordance with the present invention includes the outer cylinder member, the first divisional body, and the second divisional body. The first fitting end portion of the first divisional body and the second fitting end portion of the second divisional body are fitted to each other inside the outer cylinder member. So, the first divisional body and the second divisional body in the assist grip of the present invention correspond to latitudinal divisional bodies. In other words, the assist grip of the present invention is the latitudinal division type assist grip.

The assist grip in accordance with the present invention includes the elastic reinforcement member which is made of an elastic material. The elastic reinforcement member is interposed between an inner peripheral surface of the outer cylinder member and the first fitting end portion, and presses the first fitting end portion toward the second fitting end portion. Accordingly, the fitting of the first fitting end portion and the second fitting end portion is not easily released, even when the fitting portion therebetween is small. Therefore, the assist grip of the present invention permits the first fitting end portion and the second fitting end portion to be increased in outer diameters. Also, because the fitting of the first fitting end portion and the second fitting end portion is not easily released, the assist grip of the present invention has the sufficient load bearing capacity.

When the assist grip in accordance with the present invention includes the above (1), the outer cylinder member, the first divisional body, the second divisional body, and the elastic reinforcement member can be unitarily assembled with ease. Also, the release of the fitting of the first fitting end portion and the second fitting end portion can become more difficult.

FIGS. 1 and 2 are enlarged explanation views schematically illustrating essential parts of an example of the assist grip in accordance with the present invention which includes the above (1). In the assist grip of the present invention including the above (1), an elastic reinforcement member 4 has a reinforcement fixing portion 40 formed at an end, a reinforcement latch portion 41 formed at the other end, and a reinforcement elastic contact portion 42 which is formed between the reinforcement fixing portion 40 and the reinforcement latch portion 41. The reinforcement fixing portion 40 is fixed to a first divisional body 1. When a first fitting end portion 10 of the first divisional body 1 is inserted into an outer cylinder member 3, at least the reinforcement latch portion 41 and the reinforcement elastic contact portion 42 of the elastic reinforcement member 4 are inserted into the outer cylinder member 3.

The elastic reinforcement member 4 is configured as a plate spring, and can be deformed by being bent. For instance, as shown in FIG. 1, when inserting the first divisional body 1 and the elastic reinforcement member 4 into the outer cylinder member 3 (hereinafter, referred to as "when assembling"), the reinforcement latch portion 41 contacts an inner peripheral surface of the outer cylinder member 3, and the elastic reinforcement member 4 is pressed by the inner peripheral surface of the outer cylinder member 3 and is deformed by being bent. In the elastic reinforcement member 4, the reinforcement fixing portion 40 is fixed to the first divisional body 1, but the reinforcement latch portion 41 and the reinforcement elastic contact portion 42 are not fixed to the first divisional body 1. Accordingly, when assembling the assist grip, the elastic reinforcement member 4 is relatively easily deformed by being bent about the reinforcement fixing portion 40 as a supporting point. In other words, a load necessary to deform the elastic reinforcement member 4 to be bent becomes small, and a load necessary to insert the first divisional body 1 and the elastic reinforcement member 4 into the outer cylinder member 3 also becomes small. As a result, in accordance with the assist grip of the present invention including the above (1), the outer cylinder member 3, the first divisional body 1, the second divisional body 2, and the elastic reinforcement member 4 can be unitarily assembled with ease.

If the first fitting end portion 10 of the first divisional body 1 and the second fitting end portion 20 of the second divisional body 2 are fitted to each other, as shown in FIG. 2, the reinforcement latch portion 41 is latched on the inner peripheral surface of the outer cylinder member 3. At this time, the elastic reinforcement member 4 is deformed by being bent, and the reinforcement elastic contact portion 42 contacts elastically the first fitting end portion 10 to press the first fitting end portion 10 toward the second fitting end portion 20. At this time, because the elastic reinforcement member 4 is deformed by being bent about the reinforcement fixing portion 40 and the reinforcement latch portion 41 as the supporting points, a load necessary for the flexural deforming of the elastic reinforcement member 4 is large. Accordingly, the load of pressing the first fitting end portion 10 toward the second fitting end portion 20 by the elastic reinforcement member 4 is also large. As a result, in accordance with the assist grip of the present invention including the above (1), the release of the fitting of the first fitting end portion 10 and the second fitting end portion 20 can become more difficult.

In other words, the assist grip of the present invention including the above (1) can be easily manufactured because the necessary load when assembling the assist grip (insertion load) is small. Further, the load bearing capacity after the assembling is also superior.

When the assist grip in accordance with the present invention includes the above (1) and (2), the reinforcement latch portion 41 is latched on the inner peripheral surface of the outer cylinder member 3 and the second divisional body 2. Therefore, after the assembling, the reinforcement fixing portion 40 and the reinforcement latch portion 41 of the elastic reinforcement member 4 are securely fixed. Accordingly, the elastic reinforcement member 4 stably presses the first fitting end portion 10 toward the second fitting end portion 20. As a result, in accordance with the assist grip of the present invention including the above (1) and (2), the release of the fitting of the first fitting end portion 10 and the second fitting end portion 20 can become more difficult.

BRIEF DESCRIPTION OF THE DRAWINGS

The above and other objects and features of the present invention will become apparent from the following description of specified embodiment, given in conjunction with the accompanying drawings, in which:

FIG. 7 is a perspective view schematically illustrating an elastic reinforcement member in the assist grip in accordance with an exemplary embodiment of the present invention;

FIG. 8 is an explanation view schematically illustrating the unitarily assembled assist grip in accordance with an exemplary embodiment of the present invention;

DESCRIPTION OF THE SPECIFIC EMBODIMENTS

Various embodiments of the present invention will now be described in detail with reference to the accompanying drawings.

Figure 1:
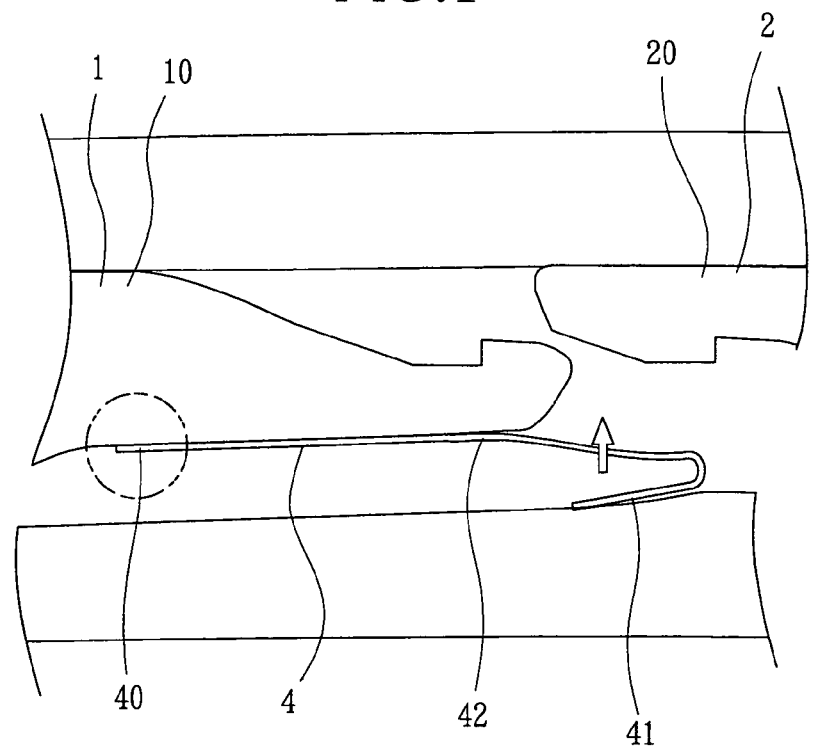
FIG. 1 is an enlarged explanation view schematically illustrating essential parts of an example of an assist grip in accordance with the present invention.
Figure 2:
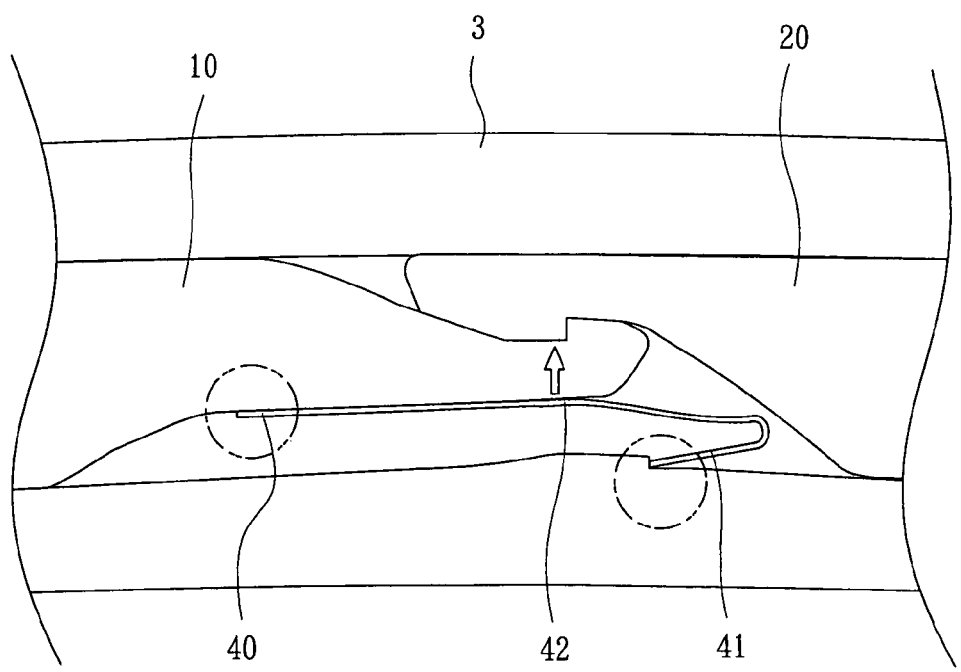
FIG. 2 is an enlarged explanation view schematically illustrating essential parts of an example of the assist grip in accordance with the present invention.
Figure 3:
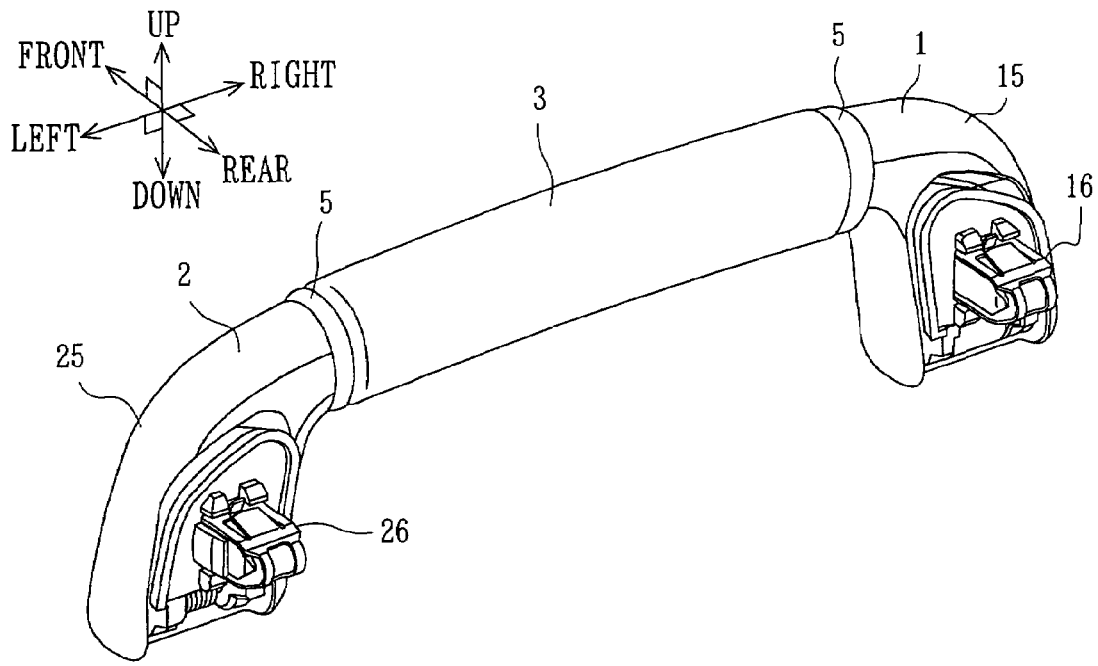
FIG. 3 is a perspective view schematically illustrating the assist grip in accordance with an exemplary embodiment of the present invention.
Figure 4:
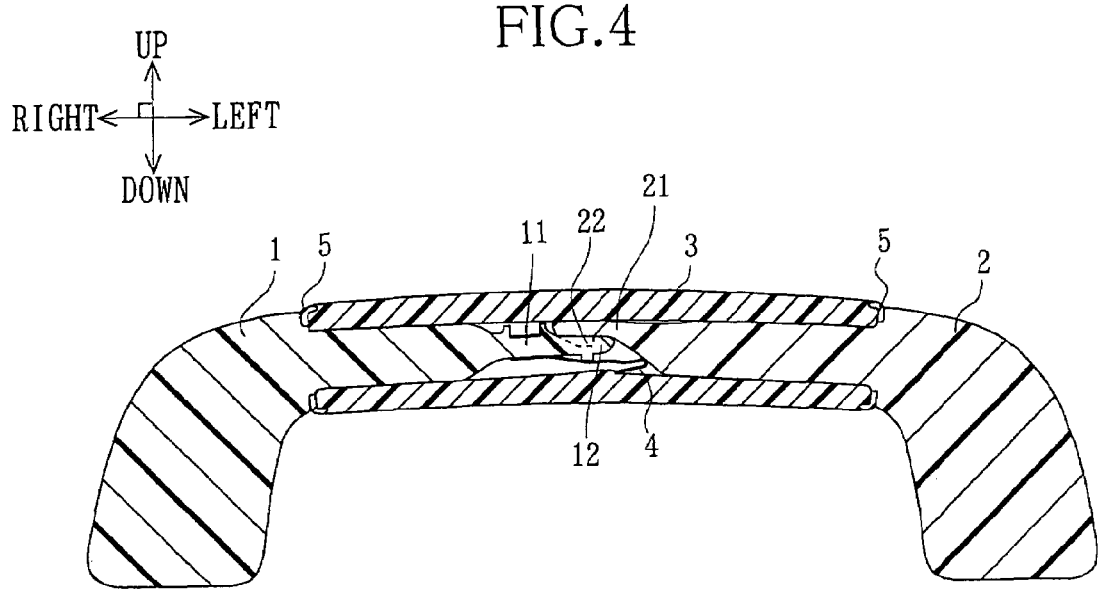
FIG. 4 is a sectional view schematically illustrating a section of the assist grip in accordance with an exemplary embodiment of the present invention when being cut in a longitudinal direction.
Figure 5:
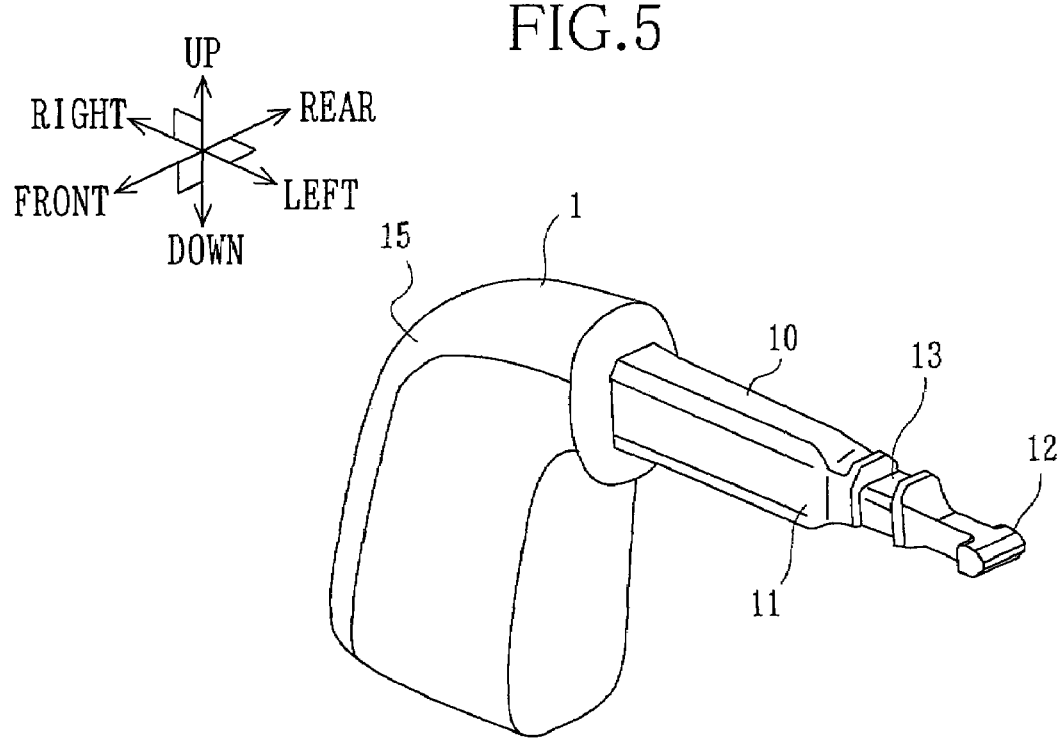
FIG. 5 is a perspective view schematically illustrating a first divisional body in the assist grip in accordance with an exemplary embodiment of the present invention.
Figure 6:
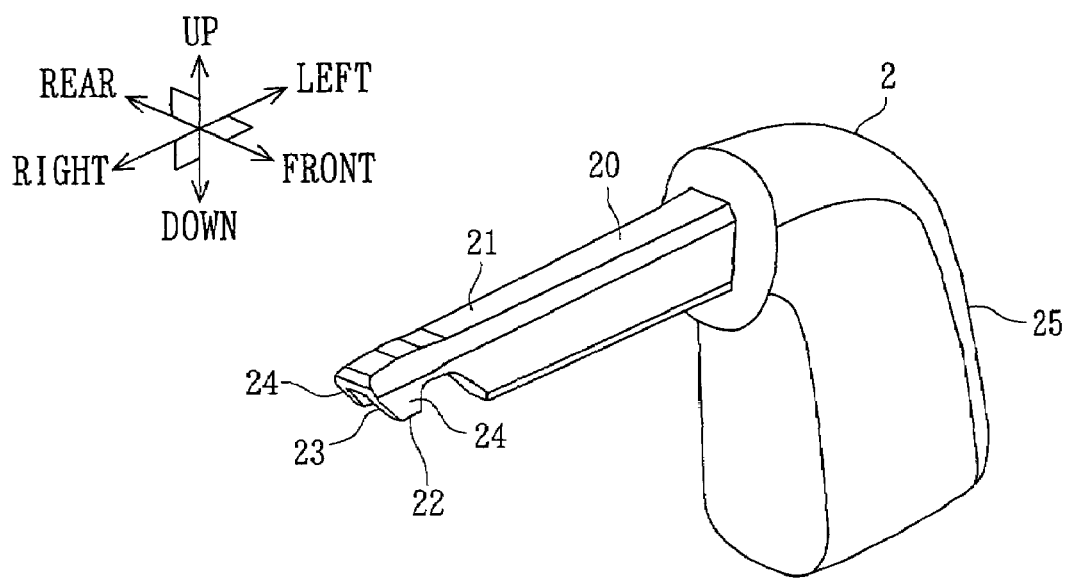
FIG. 6 is a perspective view schematically illustrating a second divisional body in the assist grip in accordance with an exemplary embodiment of the present invention.
Figure 9:
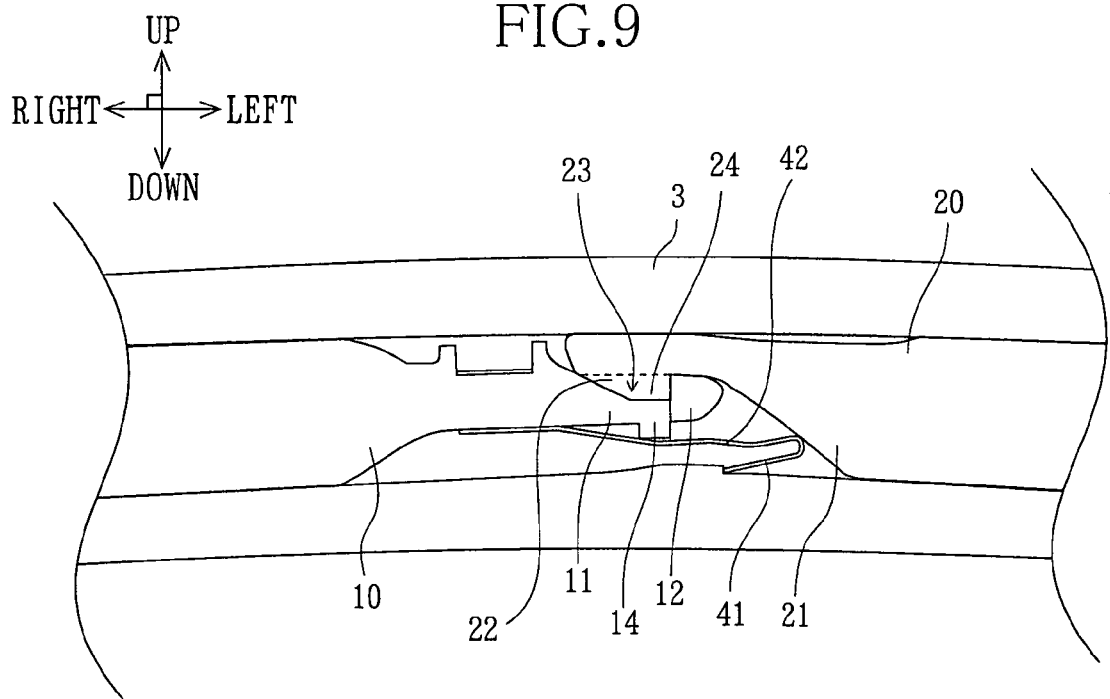
FIG. 9 is an explanation view schematically illustrating the unitarily assembled assist grip in accordance with an exemplary embodiment of the present invention.

FIG. 3 is a perspective view schematically illustrating the assist grip in accordance with an exemplary embodiment of the present invention. FIG. 4 is a sectional view schematically illustrating a section of the assist grip in accordance with an exemplary embodiment of the present invention when being cut in a longitudinal direction. FIG. 5 is a perspective view schematically illustrating a first divisional body in the assist grip in accordance with an exemplary embodiment of the present invention. FIG. 6 is a perspective view schematically illustrating a second divisional body in the assist grip in accordance with an exemplary embodiment of the present invention. FIG. 7 is a perspective view schematically illustrating an elastic reinforcement member in the assist grip in accordance with an exemplary embodiment of the present invention. FIG. 8 and FIG. 9 are an explanation view schematically illustrating the unitarily assembled assist grip in accordance with an exemplary embodiment of the present invention. Hereinafter, the up, down, left, right, front and rear in this embodiment are defined by the up, down, left, right, front and rear shown in FIG. 3.

As shown in FIG. 3, an assist grip of this embodiment includes an outer cylinder member 3, a first divisional body 1, a second divisional body 2, an elastic reinforcement member 4, and two finishing aesthetic members 5. The outer cylinder member 3 is made of a material having high stiffness, e.g., ABS resin in which glass fibers are filled, and has a cylindrical shape.

As shown in FIG. 5, the first divisional body 1 has a first fitting end portion 10 and a first fixing end portion 15. As shown in FIG. 3, the first fixing end portion 15 has a first clip 16. The first divisional body 1 is fixed to another side (e.g., vehicle body) by the first clip 16.

As shown in FIG. 5, the first fitting end portion 10 and the first fixing end portion 15 are integrally formed with each other. The first fitting end portion 10 has a first base portion 11 and a first head portion 12. The first base portion 11 has a pole shape, and extends from the first fixing end portion 15 in the left direction. A distal end portion (left end portion) of the first base portion 11 is formed to be tapered. The first head portion 12 is formed at the distal end of the first base portion 11, and protrudes toward both sides in a width direction (front side and rear side) of the first base portion 11. In the assist grip of this embodiment, the first fitting end portion 10 has a substantially T-shape. The first base portion 11 is formed with a reinforcement member holding recess 13, adjacent to the first head portion 12, to hold the elastic reinforcement member 4 which will be described later. The reinforcement member holding recess 13 has a recess shape extending in a circumferential direction of the first base portion 11. The first base portion 11 is further formed with an elastic member press portion 14 which protrudes in the down direction from an area between the reinforcement member holding recess 13 and the first head portion 12 (refer to FIG. 8).

As shown in FIG. 6, the second divisional body 2 has a second fitting end portion 20 and a second fixing end portion 25. As shown in FIG. 3, the second fixing end portion 25 has a second clip 26. The second divisional body 2 is fixed to another side by the second clip 26.

As shown in FIG. 6, the second fitting end portion 20 and the second fixing end portion 25 are integrally formed with each other. The second fitting end portion 20 has a second base portion 21 and a second head portion 22. The second base portion 21 has a pole shape, and extends from the second fixing end portion 25 in the right direction. A distal end portion (right end portion) of the second base portion 21 is formed to be tapered. The second head portion 22 is formed at the distal end of the second base portion 21, and protrudes toward one side in a thickness direction (down side in this embodiment) of the second base portion 21. The second head portion 22 is formed with a recess portion 23 which is opened to the distal end side (right side), the second fixing end portion 25 side (left side), and the down side. In other words, the second head portion 22 is formed below the second base portion 21, and has the recess portion 23 and two portions (fitting wall portions 24) which are disposed on both sides (front and rear in the drawing) of the recess portion 23. A section when cutting the second head portion 22 in the up/down direction has a substantially U-shape.

The elastic reinforcement member 4 is configured as a plate spring. As shown in FIG. 7, the elastic reinforcement member 4 has a reinforcement fixing portion 40 formed at an end, a reinforcement latch portion 41 formed at the other end, and a reinforcement elastic contact portion 42 which is formed between the reinforcement fixing portion 40 and the reinforcement latch portion 41. The reinforcement fixing portion 40 is fixed to the first divisional body 1. Particularly, the reinforcement fixing portion 40 is curved in a substantially U-shape, and is inserted into the reinforcement member holding recess 13 of the first divisional body 1. More particularly, the reinforcement fixing portion 40 is fixed to the first divisional body 1 by grasping an inner peripheral portion positioned inwardly from the reinforcement member holding recess 13 of the first base portion 11. As shown in FIG. 8, if the elastic reinforcement member 4 is fixed to the first divisional body 1, the reinforcement elastic contact portion 42 and the reinforcement latch portion 41 are positioned closer to the outer cylinder member 3 (down direction in FIG. 8) than the elastic member press portion 14, and extend toward the inner peripheral surface of the outer cylinder member 3. The reinforcement latch portion 41 has a substantially V-shape such that a distal end of the reinforcement latch portion 41 is bent to be directed toward the reinforcement fixing portion 40 (right-down direction in FIG. 8).

The finishing aesthetic members 5 are formed in an endless ring shape. As shown in FIGS. 3 and 4, the finishing aesthetic members 5 are respectively mounted in a gap in the longitudinal direction of the first fixing end portion 15 and the outer cylinder member 3 and a gap in the longitudinal direction of the second fixing end portion 25 and the outer cylinder member 3. Particularly, one finishing aesthetic member 5 is mounted on an exterior of a boundary between the first fitting end portion 10 and the first fixing end portion 15 of the first divisional body 1. The other finishing aesthetic member 5 is mounted on an exterior of a boundary between the second fitting end portion 20 and the second fixing end portion 25 of the second divisional body 2. If the first divisional body 1 and the second divisional body 2 are inserted into the outer cylinder member 3, the gap in the longitudinal direction of the first fixing end portion 15 and the outer cylinder member 3 and the gap in the longitudinal direction of the second fixing end portion 25 and the outer cylinder member 3 are respectively covered with the finishing aesthetic members 5 on the outer peripheral portions of the gaps.

A procedure of unitarily assembling the assist grip of this embodiment is as follows.

First, the second divisional body 2 is inserted into the outer cylinder member 3 through the left end side of the outer cylinder member 3, so that the second fitting end portion 20 of the second divisional body 2 is positioned inside the outer cylinder member 3 and the second fixing end portion 25 is positioned outside (left side) the outer cylinder member 3.

Next, the first divisional body 1 is inserted into the outer cylinder member 3 through the right end side of the outer cylinder member 3, so that the first fitting end portion 10 of the first divisional body 1 is positioned inside the outer cylinder member 3 and is fitted to the second fitting end portion 20. The first fixing end portion 15 is positioned outside (right side) of the outer cylinder member 3. Particularly, when the first head portion 12 is inserted to the position contacting with the second head portion 22 of the second fitting end portion 20, the first fitting end portion 10 is bent by being pressed downward by the second head portion 22. In this state, if the first divisional body 1 is inserted more, the first head portion 12 gets over the second head portion 22. If the first head portion 12 gets over the second head portion 22, the press to the first head portion 12 by the second head portion 22 is released. Accordingly, as shown in FIG. 9, a portion of the first base portion 11 is received in the recess portion 23 of the second fitting end portion 20. The first head portion 12 is exposed outside from the recess portion 23, toward the second base portion 21 side (left side). The side portions of the recess portion 23 (fitting wall portions 24) of the second head portion 22 are fitted to the first head portion 12. As a result, the first fitting end portion 10 and the second fitting end portion 20 are fitted to each other.

The elastic reinforcement member 4 is configured as a plate spring. The reinforcement fixing portion 40 formed at one end of the elastic reinforcement member 4 is fixed to the first base portion 11 of the first divisional body 1. Accordingly, if the first fitting end portion 10 of the first divisional body 1 is inserted into the outer cylinder member 3, the elastic reinforcement member 4 is also inserted into the outer cylinder member 3 together with the first fitting end portion 10.

Only the reinforcement fixing portion 40 formed at one end of the elastic reinforcement member 4 is fixed to the first divisional body 1, and the reinforcement latch portion 41 formed at the other end of the elastic reinforcement member 4 is not fixed to the first divisional body 1. The reinforcement latch portion 41 extends toward the inner peripheral surface of the outer cylinder member 3. The distal end of the reinforcement latch portion 41 is curved toward the reinforcement fixing portion 40. Accordingly, if the first fitting end portion 10 of the first divisional body 1 is inserted into the outer cylinder member 3, the elastic reinforcement member 4 makes the reinforcement latch portion 41 contact slidingly the inner peripheral surface of the outer cylinder member 3, and is inserted into the outer cylinder member 3 while being bent about the reinforcement fixing portion 40 as a supporting point (refer to FIG. 8). If the first fitting end portion 10 and the second fitting end portion 20 are fitted to each other, the reinforcement latch portion 41 is latched on the inner peripheral surface of the outer cylinder member 3 and the second base portion 21 of the second divisional body 2 (refer to FIG. 9).

At this time, the reinforcement elastic contact portion 42 of the elastic reinforcement member 4 contacts elastically the elastic member press portion 14 of the first fitting end portion 10, to press the first fitting end portion 10 toward the second fitting end portion 20. Therefore, the fitting of the first head portion 12 and the second head portion 22 is not easily released by the pressing force of the elastic reinforcement member 4.

Further, because the elastic reinforcement member 4 is bent about the reinforcement fixing portion 40 and the reinforcement latch portion 41 as the supporting points, the elastic reinforcement member 4 presses intensively the first fitting end portion 10 toward the second fitting end portion 20. Accordingly, in the assist grip of this embodiment, the first fitting end portion 10 and the second fitting end portion 20 are securely fitted to each other, and thus the load bearing capacity is enhanced.

Also, in the assist grip of this embodiment, the first fitting end portion 10 and the second fitting end portion 20 are fitted to each other in such a manner that the first base portion 11 is received in the recess portion 23 and the first head portion 12 is fitted to the fitting wall portions 24 formed at the side portions of the recess portion 23. Thus, the first base portion 11 and the fitting portion of the first head portion 12 and the second head portion 22 overlap partially with each other in the radial direction of the outer cylinder member 3. Accordingly, in the assist grip of this embodiment, although the first base portion 11 and the second base portion 21 have the large diameters, the fitting portion of the first divisional body 1 and the second divisional body 2 can be enlarged. As a result, the assist grip of this embodiment has the sufficient load bearing capacity.

The first head portion 12 is fitted to the second head portion 22 at two positions in the width direction (front/rear direction in the drawing) of the first base portion 11. So, according to the assist grip of this embodiment, although a force in the front/rear direction is applied to the assist grip, the fitting of the first fitting end portion 10 and the second fitting end portion 20 is not released. As a result, the assist grip of this embodiment has the more sufficient load bearing capacity.

Also, in the assist grip of this embodiment, the gap in the longitudinal direction of the first fixing end portion 15 and the outer cylinder member 3 and the gap in the longitudinal direction of the second fixing end portion 25 and the outer cylinder member 3 are covered with the finishing aesthetic members 5 on the outer peripheral portions of the gaps. Accordingly, the gap in the longitudinal direction of the first fixing end portion 15 and the outer cylinder member 3 and the gap in the longitudinal direction of the second fixing end portion 25 and the outer cylinder member 3 are invisible from the outside of the assist grip, and thus the aesthetic quality of the assist grip is improved.

Figure 10:
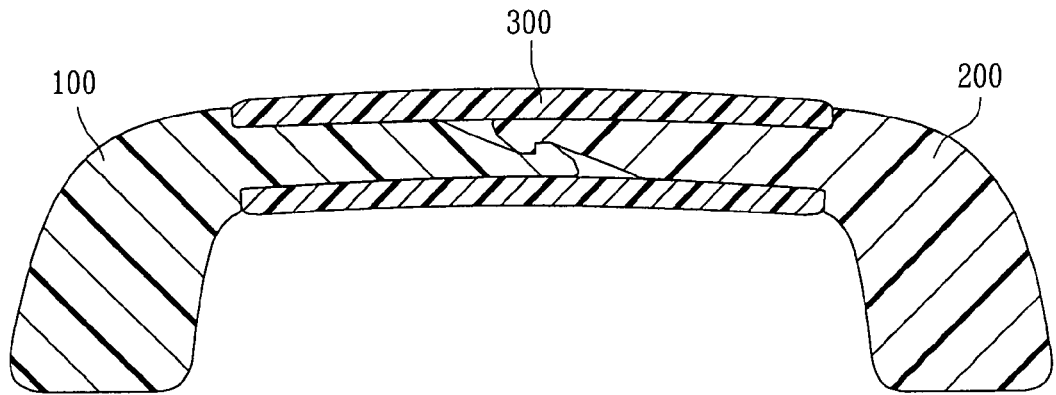
FIG. 10 is a sectional view schematically illustrating a section of a conventional assist grip when being cut in a longitudinal direction.
Figure 11:
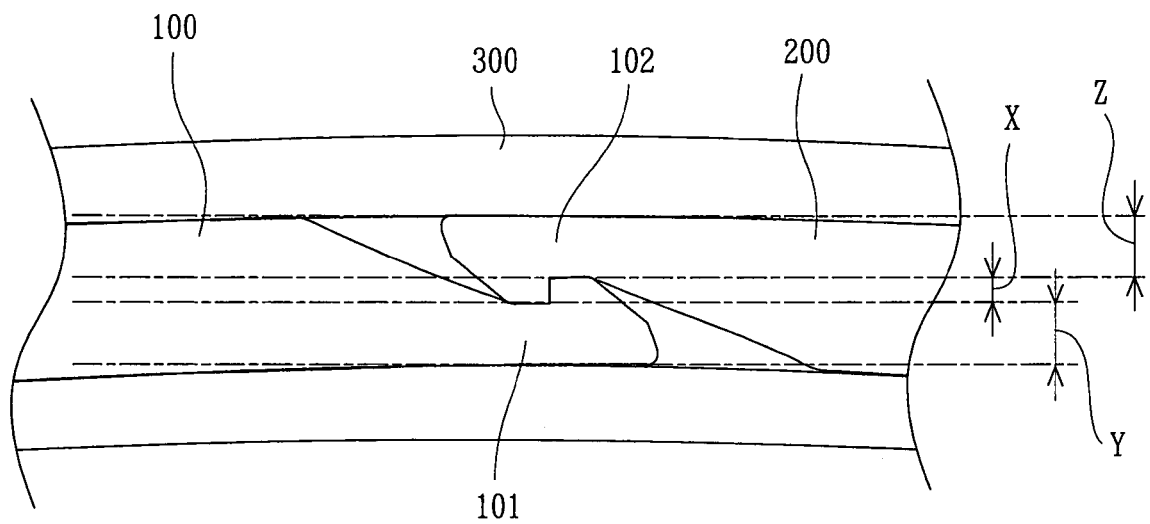
FIG. 11 is an enlarged explanation view schematically illustrating essential parts of the conventional assist grip.

Also, in the assist grip of this embodiment, the elastic reinforcement member is configured as a plate spring. However, this is not restricted thereto, so long as the elastic reinforcement member in the assist grip of the present invention is made of an elastic material and can press the first fitting end portion toward the second fitting end portion. For instance, the elastic reinforcement member can be configured as a helical spring, a spring made of resin, a rubber, or the like. Also, in the assist grip of this embodiment, the fitting portion of the first head portion and the second head portion overlaps partially with the first base portion in the radial direction of the outer cylinder member. However, the shapes of the first fitting end portion and the second fitting end portion in the assist grip of the present invention are not restricted thereto. For instance, it does not matter if the first fitting end portion and the second fitting end portion have the conventional shapes which are shown in FIGS. 10 and 11. In also this case, if the elastic reinforcement member presses the first fitting end portion toward the second fitting end portion, the fitting of the first fitting end portion and the second fitting end portion is not released, identically to the assist grip of this embodiment.

While the invention has been shown and described with respect to the preferred embodiments, it will be understood by those skilled in the art that various changes and modification may be made without departing from the spirit and scope of the invention as defined in the following claims.

What is claimed is:

1. An assist grip comprising:
   an outer cylinder member which is made of a material having high stiffness and has a cylindrical shape;
   a first divisional body that has a first fitting end portion and a first fixing end portion, wherein the first fixing end is adapted to be fixed to a separate element, and wherein the first fitting end portion is inserted into the outer cylinder member through one end side of the outer cylinder member;
   a second divisional body that has a second fitting end portion and a second fixing end portion, wherein the second fixing end portion is adapted to be fixed to the separate element, and wherein the second fitting end portion is inserted into the outer cylinder member through the other end side of the outer cylinder member and is fitted to the first fitting end portion; and
   an elastic reinforcement member which is made of an elastic material,
   wherein the elastic reinforcement member is interposed between an inner peripheral surface of the outer cylinder member and the first fitting end portion, and presses the first fitting end portion toward the second fitting end portion.

2. The assist grip according to claim 1, wherein the elastic reinforcement member is configured as a plate spring, and has a reinforcement fixing portion formed at an end, a reinforcement latch portion formed at the other end, and a reinforcement elastic contact portion which is formed between the reinforcement fixing portion and the reinforcement latch portion,
   the reinforcement fixing portion is fixed to the first divisional body, and
   when the first fitting end portion and the second fitting end portion are fitted to each other, at least the reinforcement latch portion and the reinforcement elastic contact portion are inserted into the outer cylinder member, the reinforcement latch portion is latched on the inner peripheral surface of the outer cylinder member, and the reinforcement elastic contact portion contacts elastically the first fitting end portion to press the first fitting end portion toward the second fitting end portion.

3. The assist grip according to claim 2, wherein when the first fitting end portion and the second fitting end portion are fitted to each other, the reinforcement latch portion is latched on the inner peripheral surface of the outer cylinder member and the second divisional body.

* * * * *